(12) United States Patent
Jozaki et al.

(10) Patent No.: US 11,041,535 B2
(45) Date of Patent: Jun. 22, 2021

(54) CONTROL APPARATUS FOR SYNCHRONOUS MESHING MECHANISM

(71) Applicant: TOYOTA JIDOSHA KABUSHIKI KAISHA, Toyota (JP)

(72) Inventors: Ken Jozaki, Toyota (JP); Takashi Seo, Toyota (JP); Toshio Suzuki, Toyota (JP); Hiroki Takeda, Okazaki (JP); Yoshisuke Kametani, Nagoya (JP); Shun Minaki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/881,161

(22) Filed: May 22, 2020

(65) Prior Publication Data

US 2020/0408264 A1 Dec. 31, 2020

(30) Foreign Application Priority Data

Jun. 28, 2019 (JP) .............................. JP2019-122382

(51) Int. Cl.
*F16D 48/06* (2006.01)
*F16H 63/30* (2006.01)
(Continued)

(52) U.S. Cl.
CPC ......... *F16D 48/066* (2013.01); *F16D 23/025* (2013.01); *F16D 25/14* (2013.01); *F16H 61/0403* (2013.01); *F16H 63/3023* (2013.01); *F16D 2500/1026* (2013.01); *F16D 2500/3056* (2013.01); *F16D 2500/30404* (2013.01);
(Continued)

(58) Field of Classification Search
None
See application file for complete search history.

(56) References Cited

U.S. PATENT DOCUMENTS 6,276,224 B1    8/2001    Ueda et al.
6,619,152 B2 *   9/2003    Ochi ................... F16H 61/2807
                                                                                             74/335

(Continued)

FOREIGN PATENT DOCUMENTS

DE    10 2010 018 194 A1    11/2010
JP       2000-337487 A     12/2000

(Continued)

*Primary Examiner* — Timothy Hannon
(74) *Attorney, Agent, or Firm* — Oblon, McClelland, Maier & Neustadt, L.L.P.

(57) ABSTRACT

A control apparatus for a synchronous meshing mechanism that is equipped with a gear, a sleeve, a synchronizer ring, and a hydraulic actuator is provided. When it is determined that the sleeve and the gear have been rotationally synchronized with each other in an engagement transition period of the synchronous meshing mechanism, an electronic control unit with which the control apparatus is equipped sets a command pressure for the hydraulic actuator to an intermediate pressure that is lower than a meshing completion pressure. Besides, when meshing has not been completed even after the lapse of a predetermined time from a timing when the command pressure for the hydraulic actuator is set to the intermediate pressure, the electronic control unit sets the command pressure for the hydraulic actuator to the meshing completion pressure.

4 Claims, 5 Drawing Sheets

(51) Int. Cl.
*F16D 48/02* (2006.01)
*F16D 23/02* (2006.01)
*F16H 61/04* (2006.01)
*F16H 61/28* (2006.01)

(52) U.S. Cl.
CPC .............. *F16D 2500/30803* (2013.01); *F16D 2500/3166* (2013.01); *F16D 2500/70406* (2013.01); *F16H 2061/0474* (2013.01); *F16H 2061/2823* (2013.01); *F16H 2063/3093* (2013.01)

(56) References Cited

U.S. PATENT DOCUMENTS

| | | | |
|---|---|---|---|
| 6,694,834 B2* | 2/2004 | Bansbach | F16H 61/32 |
| | | | 192/84.6 |
| 6,935,204 B2 | 8/2005 | Walker et al. | |
| 7,735,388 B2* | 6/2010 | Sakamoto | F16H 61/2807 |
| | | | 74/339 |
| 2004/0145321 A1* | 7/2004 | Yasui | F16H 61/0403 |
| | | | 318/135 |
| 2009/0150033 A1 | 6/2009 | Kawamoto | |
| 2017/0001647 A1* | 1/2017 | Sakamoto | F16D 48/06 |
| 2019/0301600 A1* | 10/2019 | Matsuura | F16H 61/0403 |

FOREIGN PATENT DOCUMENTS

| | | |
|---|---|---|
| JP | 2009-103211 A | 5/2009 |
| JP | 2017-026008 A | 2/2017 |

\* cited by examiner

CONTROL APPARATUS FOR SYNCHRONOUS MESHING MECHANISM

CROSS-REFERENCE TO RELATED APPLICATIONS

This application claims priority to Japanese Patent Application No. 2019-122382 filed on Jun. 28, 2019, incorporated herein by reference in its entirety.

BACKGROUND

1. Technical Field

The disclosure relates to a control apparatus for a synchronous meshing mechanism, and to reduction of a collision noise that is produced in an engagement transition period of the synchronous meshing mechanism.

2. Description of Related Art

There is known a synchronous meshing mechanism that is equipped with a rotary shaft, a gear (a reverse gear) that fits the rotary shaft rotatably relatively thereto, a sleeve that fits an outer peripheral portion of the rotary shaft unrotatably relatively thereto and movably in an axial direction thereof, and a synchronizer ring that is interposed between the gear and the sleeve. The configuration of a synchromesh transmission described in Japanese Patent Application Publication No. 2000-337487 (JP 2000-337487 A) is such an example. It is described in Japanese Patent Application Publication No. 2000-337487 (JP 2000-337487 A) that the synchronous meshing mechanism is operated by a hydraulic actuator, and that a sleeve of the synchronous meshing mechanism needs a thrust force surpassing a resistance force resulting from a drag torque in a jostling transition period in which spline teeth of the sleeve jostle spline teeth of the gear respectively. Furthermore, it is described that a collision noise that is produced in the jostling transition period is reduced by reducing at least one of the thrust force of the sleeve and a moving speed of the sleeve, before the start of the jostling by the spline teeth of the sleeve.

SUMMARY

By the way, in Japanese Patent Application Publication No. 2000-337487 (JP 2000-337487 A), when the oil temperature of hydraulic oil in the transmission has fallen, the resistance force resulting from the drag torque applied to the sleeve increases. Therefore, the thrust force of the sleeve that takes reduction of the collision noise into account does not allow the sleeve to surpass the resistance force. Thus, a sleeve failure may occur with the sleeve unable to move.

The disclosure provides a control apparatus for a synchronous meshing mechanism that can reduce a collision noise in an engagement transition period in the synchronous meshing mechanism and that can complete engagement of the synchronous meshing mechanism even when the temperature of hydraulic oil becomes low.

An aspect of the disclosure is a control apparatus for a synchronous meshing mechanism having a gear, a sleeve, a synchronizer ring, and a hydraulic actuator. The gear is configured to fit a rotary shaft rotatably relatively to the rotary shaft. The sleeve is provided unrotatably relatively to the rotary shaft and movably relatively to the rotary shaft in an axial direction of the rotary shaft. The synchronizer ring is interposed between the gear and the sleeve. The hydraulic actuator is configured to apply a thrust force to the sleeve. The hydraulic actuator is configured to move the sleeve in the axial direction of the rotary shaft, and mesh a spline tooth that is provided on the gear and a spline tooth that is provided on the sleeve with each other after rotationally synchronizing the sleeve and the gear with each other via the synchronizer ring, upon moving the sleeve toward the gear side in the axial direction of the rotary shaft. The control apparatus is equipped with an electronic control unit that is configured as follows. That is, the electronic control unit sets a command pressure for the hydraulic actuator to an intermediate pressure that is lower than a meshing completion pressure at which the spline tooth of the sleeve and the spline tooth of the gear are meshed with each other, when it is determined that the sleeve and the gear have been rotationally synchronized with each other, and sets the command pressure for the hydraulic actuator to the meshing completion pressure when the spline tooth of the sleeve and the spline tooth of the gear have been meshed with each other. Then, the electronic control unit sets the command pressure for the hydraulic actuator to the meshing completion pressure when the spline tooth of the sleeve and the spline tooth of the gear have not been meshed with each other even after lapse of a predetermined time set in advance from a timing when the command pressure for the hydraulic actuator is set to the intermediate pressure.

With the control apparatus for the synchronous meshing mechanism according to the aforementioned aspect, when it is determined that the sleeve and the gear have been rotationally synchronized with each other in the engagement transition period of the synchronous meshing mechanism, the command pressure for the hydraulic actuator is set to the intermediate pressure that is lower than the meshing completion pressure. Thus, the thrust force of the sleeve becomes small, and the collision noise that is produced when the spline tooth of the sleeve and the spline tooth of the gear collide with each other while the sleeve moves is reduced. It should be noted herein that when the oil temperature of hydraulic oil becomes low, the drag torque applied to the sleeve increases. Thus, when the command pressure for the hydraulic actuator is set to the intermediate pressure, the thrust force of the sleeve becomes smaller than the resistance force resulting from the drag torque, and a sleeve failure may occur with the sleeve unable to move toward the gear side. In contrast, when the spline tooth of the sleeve and the spline tooth of the gear have not been meshed with each other even after the lapse of the predetermined time from the timing when the command pressure for the hydraulic actuator is set to the intermediate pressure, the command pressure for the hydraulic actuator is set to the meshing completion pressure. Therefore, even when the sleeve becomes unable to move toward the gear side, the command pressure for the hydraulic actuator is set to the meshing completion pressure upon the lapse of the predetermined time. Thus, the sleeve is forcibly moved toward the gear side, and the sleeve failure is resolved. In this manner, reduction of the collision noise that is produced in the engagement transition period of the synchronous meshing mechanism and resolution of the sleeve failure can be made compatible with each other.

In the control apparatus according to the aforementioned aspect, the electronic control unit may be configured to set the command pressure to the intermediate pressure assuming a value at which the spline tooth of the sleeve can move while jostling a spline tooth of the synchronizer ring and the spline tooth of the gear, after rotational synchronization of the synchronous meshing mechanism.

With the control apparatus configured as described above, the electronic control unit sets the command pressure to the intermediate pressure assuming the value at which the sleeve can jostle the gear and mesh with the synchronizer ring when the spline tooth of the sleeve is pressed against the spline tooth of the gear, in the engagement transition period of the synchronous meshing mechanism. Therefore, the collision noise that is produced in the engagement transition period of the synchronous meshing mechanism can be reduced.

In the control apparatus according to the aforementioned aspect, the electronic control unit may be configured to set the meshing completion pressure to a value at which the spline tooth of the sleeve and the spline tooth of the gear can be forcibly meshed with each other, regardless of an influence of an oil temperature of a hydraulic oil in the synchronous meshing mechanism.

With the control apparatus configured as described above, even if the resistance force in meshing the spline tooth of the sleeve and the spline tooth of the gear with each other becomes large when the oil temperature of hydraulic oil is low in the engagement transition period of the synchronous meshing mechanism, the electronic control unit sets the meshing completion pressure to a value at which the spline tooth of the sleeve and the spline tooth of the gear can be forcibly meshed with each other. Therefore, the spline tooth of the sleeve and the spline tooth of the gear can be reliably meshed with each other.

In the control apparatus according to the aforementioned aspect, the electronic control unit may be configured to change the predetermined time in accordance with the oil temperature of the hydraulic oil, and set the predetermined time longer when the oil temperature of the hydraulic oil is low than when the oil temperature of the hydraulic oil is high.

With the control apparatus configured as described above, the predetermined time as a determination threshold for determining whether to set the command pressure for the hydraulic actuator to the meshing completion pressure or not is set longer when the oil temperature of hydraulic oil is low than when the oil temperature of hydraulic oil is high. When the oil temperature of hydraulic oil becomes low, the resistance force applied to the sleeve becomes large, and the responsiveness of the hydraulic actuator also deteriorates. Therefore, the time that is required until the sleeve moves to the meshing completion position also becomes long. Accordingly, the predetermined time is changed in accordance with the oil temperature of hydraulic oil, and hence assumes an appropriate value corresponding to the oil temperature of hydraulic oil. In this connection, in the case where no sleeve failure occurs even when the oil temperature of hydraulic oil is low, the meshing can be completed with the command pressure equal to the intermediate pressure. As a result, the collision sound that is produced in the engagement transition period of the synchronous meshing mechanism can be effectively reduced.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

One of the embodiments of the disclosure will be described hereinafter in detail with reference to the drawings. Incidentally, in the following embodiment, the drawings are simplified or transformed as appropriate, and the dimensional ratios among respective components, the shapes thereof, and the like are not necessarily depicted with precision.

Figure 1:
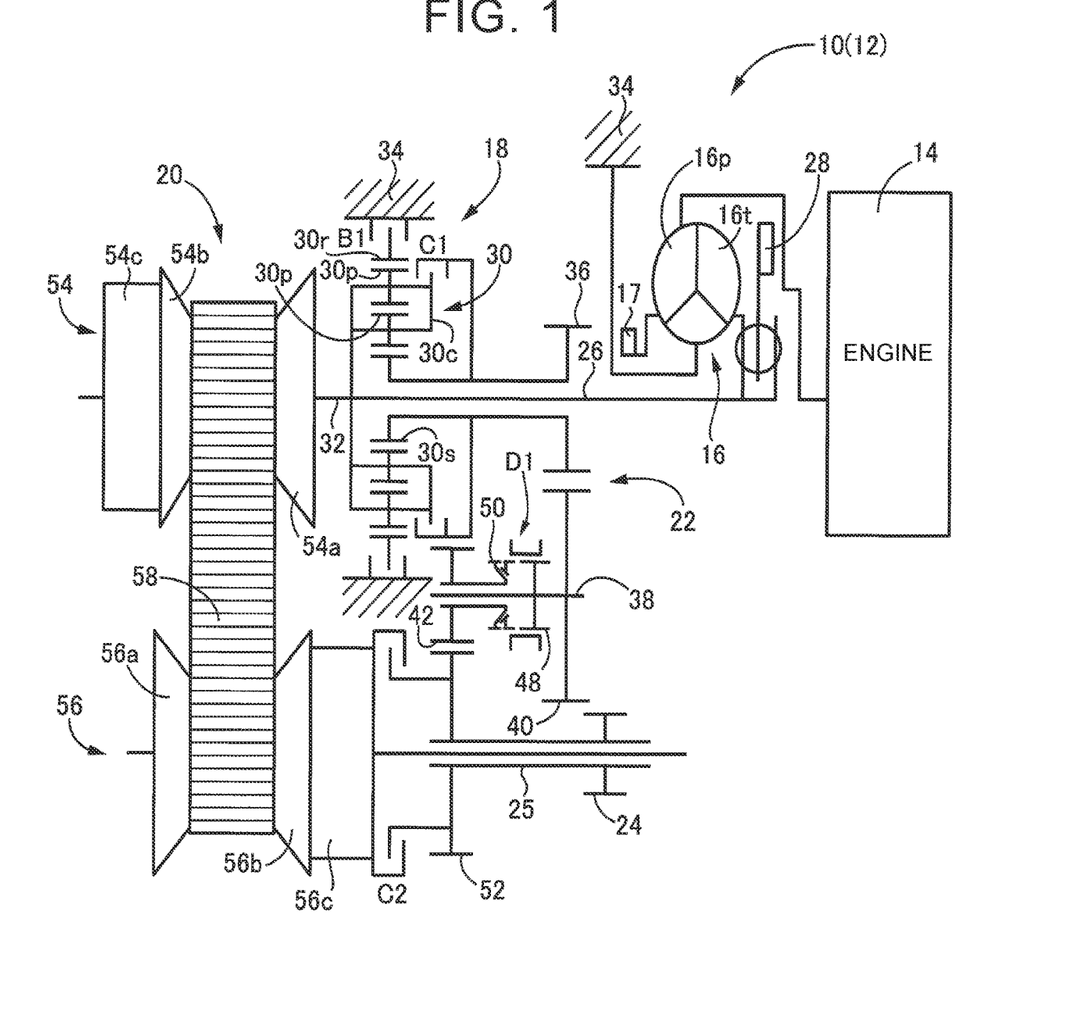
FIG. 1 is a skeleton diagram for illustrating the general configuration of a motive power transmission device with which a vehicle mounted with a control apparatus for a synchronous meshing mechanism according to one of the embodiments as an example of the disclosure is equipped.

FIG. 1 is a skeleton diagram for illustrating the general configuration of a motive power transmission device 12 with which a vehicle 10 mounted with a control apparatus for a synchronous meshing mechanism according to the embodiment as an example of the disclosure is equipped. The motive power transmission device 12 is configured to include a torque converter 16 as a hydraulic transmission device that is coupled to an engine 14 that is used as, for example, a driving force source for running, a forward/backward changeover device 18, a belt-type continuously variable transmission 20 (hereinafter referred to as the continuously variable transmission 20), a gear mechanism 22, and an output shaft 25 that is provided with an output gear 24 capable of transmitting motive power to driving wheels (not shown). The motive power transmission device 12 is equipped with a first motive power transmission path and a second motive power transmission path in parallel with each other, and is configured to make a changeover between these motive power transmission paths in accordance with a running state of the vehicle 10. In the first motive power transmission path, a torque (a driving force)

that is output from the engine 14 is input to a turbine shaft 26 as an input shaft via the torque converter 16, and this torque is input from the turbine shaft 26 to the output shaft 25 via the gear mechanism 22 and the like. In the second motive power transmission path, the torque input to the turbine shaft 26 is transmitted to the output shaft 25 via the continuously variable transmission 20.

The engine 14 is configured as an internal combustion engine, for example, a gasoline engine, a diesel engine or the like. The torque converter 16 is equipped with a pump impeller 16$p$ and a turbine impeller 16$t$, and transmits motive power via a fluid. The pump impeller 16$p$ is coupled to a crankshaft of the engine 14. The turbine impeller 16$t$ is coupled to the forward/backward changeover device 18 via the turbine shaft 26, which is equivalent to an output-side member of the torque converter 16. Besides, a lockup clutch 28 is provided between the pump impeller 16$p$ and the turbine impeller 16$t$. The pump impeller 16$p$ and the turbine impeller 16$t$ are integrally rotated through complete engagement of this lockup clutch 28. An oil pressure control circuit and an oil pump 17 serving as an oil pressure source of lubricating oil are rotationally driven by the engine 14 via the pump impeller 16$p$.

The forward/backward changeover device 18 is a planetary gear-type forward/backward changeover device that is mainly constituted of a forward clutch C1, a backward brake B1, and a double pinion-type planetary gear device 30. In the forward/backward changeover device 18, a carrier 30$c$ that rotatably supports a pinion 30$p$ is coupled to the turbine shaft 26 of the torque converter 16 and an input shaft 32 of the continuously variable transmission 20, a ring gear 30$r$ is selectively coupled to a housing 34 as a non-rotary member via the backward brake B1, and a sun gear 30$s$ is coupled to a small-diameter gear 36. Besides, the sun gear 30$s$ and the carrier 30$c$ are selectively coupled to each other via the forward clutch C1. Each of the forward clutch C1 and the backward brake B1 is equivalent to a disconnection/connection device, and is a hydraulic frictional engagement device that is frictionally engaged by a hydraulic actuator.

Besides, the sun gear 30$s$ of the planetary gear device 30 is coupled to the small-diameter gear 36 constituting the gear mechanism 22. The gear mechanism 22 is configured to include the small-diameter gear 36, and a large-diameter gear 40 that is provided on a countershaft 38 unrotatably relatively thereto. An idler gear 42 is provided around the same rotational axis as that of the countershaft 38, rotatably relatively to the countershaft 38. Besides, a claw clutch D1 that selectively disconnects/connects the countershaft 38 and the idler gear 42 from/to each other is provided therebetween. Incidentally, the countershaft 38 is an example of the rotary shaft of the disclosure. The claw clutch D1 is an example of the synchronous meshing mechanism of the disclosure.

The claw clutch D1 includes a first gear 48, a second gear 50, a hub sleeve 61, and a synchronizer ring 64. The first gear 48 is provided on the countershaft 38. The second gear 50 fits the countershaft 38 rotatably relatively thereto. The hub sleeve 61 is provided unrotatably relatively to the countershaft 38 and movably relatively thereto in an axial direction thereof, and is provided with spline teeth 70 (see FIGS. 3A and 3B) that can be meshed with (can be engaged with) spline teeth 49 (see an upper stage of FIG. 6) of the first gear 48 and spline teeth 74 (see FIGS. 3A and 3B) of the second gear 50 respectively. The synchronizer ring 64 is interposed between the second gear 50 and the hub sleeve 61. The countershaft 38 and the idler gear 42 are relatively unrotatably connected to each other through the meshing of the spline teeth 70 of the hub sleeve 61 with the spline teeth 49 of this first gear 48 and the spline teeth 74 of the second gear 50 respectively. The second gear 50 is molded integrally with the idler gear 42. Besides, the synchronizer ring 64 functions as a synchronous mechanism that rotationally synchronizes the first gear 48 and the second gear 50 with each other in an engagement transition period of the claw clutch D1, and the claw clutch D1 is equivalent to a synchro mesh mechanism having a synchronization mechanism.

The idler gear 42 is meshed with an input gear 52 that is larger in diameter than the idler gear 42. The input gear 52 is provided unrotatably relatively to the output shaft 25 that is arranged on the same rotational axial center as that of a later-described secondary pulley of the continuously variable transmission 20. The output shaft 25 is arranged rotatably around the rotational axial center, and the input gear 52 and the output gear 24 are provided on the output shaft 25 unrotatably relatively thereto. Thus, on the first motive power transmission path where the torque of the engine 14 is transmitted from the turbine shaft 26 to the output shaft 25 via the gear mechanism 22, the forward clutch C1, the backward brake B1, and the claw clutch D1 are provided.

Besides, a belt running clutch C2 that disconnects/connects the continuously variable transmission 20 and the output shaft 25 from/to each other is interposed therebetween. The second motive power transmission path where the torque of the engine 14 is transmitted to the output shaft 25 via the input shaft 32 and the continuously variable transmission 20 is formed through engagement of this belt running clutch C2. Besides, when the belt running clutch C2 is released, the second motive power transmission path is shut off, and no torque is transmitted to the output shaft 25 via the continuously variable transmission 20.

The continuously variable transmission 20 is provided on a motive power transmission path between the input shaft 32 coupled to the turbine shaft 26 and the output shaft 25. The continuously variable transmission 20 is equipped with a primary pulley 54 (a variable pulley 54), a secondary pulley 56 (a variable pulley 56), and a transmission belt 58, and the transmission of motive power is carried out via a frictional force between a pair of the variable pulleys 54, 56 and the transmission belt 58. The primary pulley 54 has a variable effective diameter as an input-side member provided on the input shaft 32. The secondary pulley 56 has a variable effective diameter as an output-side member. The transmission belt 58 is hung between the variable pulleys 54, 56.

The primary pulley 54 is configured to be equipped with a fixed sheave 54$a$, a movable sheave 54$b$, and a primary-side hydraulic actuator 54$c$. The fixed sheave 54$a$ is an input-side fixed rotating body fixed to the input shaft 32. The movable sheave 54$b$ is an input-side movable rotating body provided unrotatably relatively to the input shaft 32 and movably relatively thereto in the axial direction thereof. The primary-side hydraulic actuator 54$c$ generates a thrust force for moving the movable sheave 54$b$ to change a V-groove width between the fixed sheave 54$a$ and the movable sheave 54$b$. Besides, the secondary pulley 56 is configured to be equipped with a fixed sheave 56$a$, a movable sheave 56$b$, and a secondary-side hydraulic actuator 56$c$. The fixed sheave 56$a$ is an output-side fixed rotating body. The movable sheave 56$b$ is an output-side movable rotating body that is provided unrotatably relatively to the fixed sheave 56$a$ and movably relatively thereto in the axial direction thereof. The secondary-side hydraulic actuator 56$c$ generates a thrust force for moving the movable sheave 56$b$ to change a V-groove width between the fixed sheave 56$a$ and the movable sheave 56$b$.

An actual speed ratio (a gear ratio) γ (=an input shaft rotational speed Nin/an output shaft rotational speed Nout) is continuously changed through changes in the hanging diameter (the effective diameter) of the transmission belt 58 due to changes in the V-groove width between the variable pulleys 54, 56. For example, when the V-groove width of the primary pulley 54 is narrowed, the speed ratio γ is reduced. That is, the continuously variable transmission 20 is upshifted. Besides, when the V-groove width of the primary pulley 54 is widened, the speed ratio γ is increased. That is, the continuously variable transmission 20 is downshifted.

Figure 2:
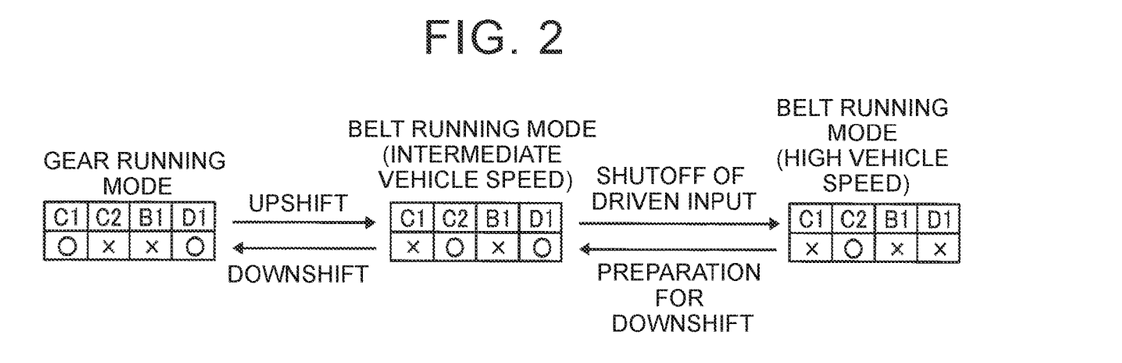
FIG. 2 is an engagement operation chart of engagement elements for respective running patterns in the motive power transmission device of FIG. 1.

The operation of the motive power transmission device 12 configured as described above will be described hereinafter, through the use of an engagement chart of engagement elements for respective running patterns shown in FIG. 2. In FIG. 2, C1 corresponds to the operation state of the forward clutch C1. C2 corresponds to the operation state of the belt running clutch C2. B1 corresponds to the operation state of the backward brake B1. D1 corresponds to the operation state of the claw clutch D1. Each circle indicates engagement (connection), and each cross indicates release (shutoff).

First of all, a running pattern in which the torque of the engine 14 is transmitted to the output gear 24 via the gear mechanism 22, namely, a running pattern in which the torque is transmitted through the first motive power transmission path will be described. This running pattern corresponds to a gear running mode of FIG. 2. As shown in FIG. 2, while the forward clutch C1 and the claw clutch D1 are engaged (connected), the belt running clutch C2 and the backward brake B1 are released (shut off).

Through engagement of the forward clutch C1, the planetary gear device 30 constituting the forward/backward changeover device 18 is integrally rotated, so the small-diameter gear 36 is rotated at the same rotational speed as the turbine shaft 26. Besides, the small-diameter gear 36 is meshed with the large-diameter gear 40 that is provided on the countershaft 38, so the countershaft 38 is also rotated in the same manner. Furthermore, the claw clutch D1 is engaged, so the countershaft 38 and the idler gear 42 are connected to each other. This idler gear 42 and the input gear 52 are meshed with each other, so the output shaft 25 and the output gear 24 that are provided integrally with the input gear 52 are rotated. In this manner, when the forward clutch C1 and the claw clutch D1 that are provided in the first motive power transmission path are engaged, the motive power of the engine 14 is transmitted to the output shaft 25 and the output gear 24 via the torque converter 16, the turbine shaft 26, the forward/backward changeover device 18, the gear mechanism 22, the idler gear 42, and the like.

Next, the running pattern in which the torque of the engine 14 is transmitted to the output gear 24 via the continuously variable transmission 20 will be described. This running pattern corresponds to a belt running mode (high vehicle speed) of FIG. 2. As indicated by the belt running mode of FIG. 2, while the belt running clutch C2 is connected, the forward clutch C1, the backward brake B1, and the claw clutch D1 are shut off. Through connection of the belt running clutch C2, the secondary pulley 56 and the output shaft 25 are connected, so the secondary pulley 56, the output shaft 25, and the output gear 24 are rotated integrally with one another. Accordingly, when the belt running clutch C2 is connected, the second motive power transmission path is formed, and the motive power of the engine 14 is transmitted to the output gear 24 via the torque converter 16, the turbine shaft 26, the input shaft 32, the continuously variable transmission 20, and the output shaft 25. At this time, the claw clutch D1 is released (shut off) during the belt running mode (high vehicle speed) in which the motive power of the engine 14 is transmitted via this second motive power transmission path, in order to eliminate the dragging of the gear mechanism 22 and the like while the vehicle runs in the belt running mode (high vehicle speed), and prevent the rotational speeds of the gear mechanism 22 and the like from rising at high vehicle speed.

The gear running mode is selected in a low vehicle speed region. A speed ratio γg (the input shaft rotational speed Nin/the output shaft rotational speed Nout) based on this first motive power transmission path is set to a value that is larger than a maximum speed ratio γmax of the continuously variable transmission 20. That is, the speed ratio γg is set to a value that is not set in the continuously variable transmission 20. Then, when it is determined that a changeover to the belt running mode should be made due to, for example, a rise in a vehicle speed V or the like, the changeover to the belt running mode is made. It should be noted herein that the belt running mode (intermediate vehicle speed) of FIG. 2 is transiently passed through in a transition period of a changeover from the gear running mode to the belt running mode (high vehicle speed) or a changeover from the belt running mode (high vehicle speed) to the gear running mode.

For example, when a changeover from the gear running mode to the belt running mode (high vehicle speed) is made, the changeover is transiently made from a state corresponding to gear running where the forward clutch C1 and the claw clutch D1 are engaged to a state where the belt running clutch C2 and the claw clutch D1 are engaged. That is, a hanging replacement of the forward clutch C1 and the belt running clutch C2 is started. At this time, the motive power transmission path is changed from the first motive power transmission path to the second motive power transmission path, and the motive power transmission device 12 is substantially upshifted. Then, after the motive power transmission path is changed over, the claw clutch D1 is released (shut off) to prevent unnecessary dragging and prevent the rotational speeds of the gear mechanism 22 and the like from rising (driven input shutoff).

Besides, when a changeover from the belt running mode (high vehicle speed) to the gear running mode is made, a changeover from a state where the belt running clutch C2 is engaged to a state where the claw clutch D1 is engaged in preparation for the changeover to the gear running mode is transiently made (preparation for downshift). At this time, rotation is transmitted to the sun gear 30s of the planetary gear device 30 as well via the gear mechanism 22, and a hanging replacement of the forward clutch C1 and the belt running clutch C2 (engagement of the forward clutch C1 and release of the belt running clutch C2) is carried out from this state. Thus, the motive power transmission path is changed over from the second motive power transmission path to the first motive power transmission path. At this time, the motive power transmission device 12 is substantially downshifted.

Figure 3A:
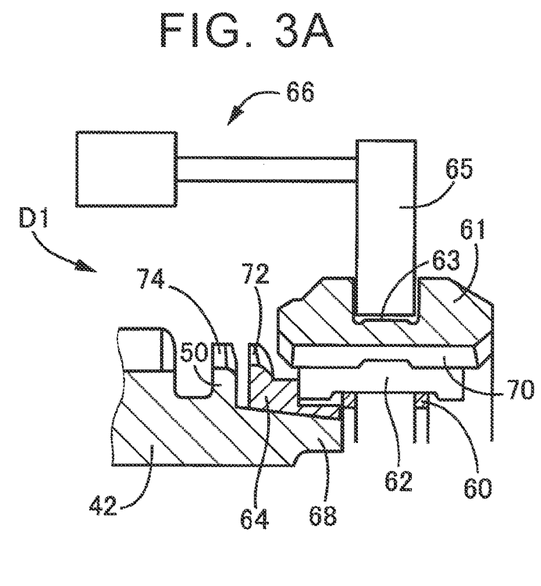
FIG. 3A is a cross-sectional view illustrating the configuration and operation of a claw clutch of FIG. 1 in a released state thereof.
Figure 3B:
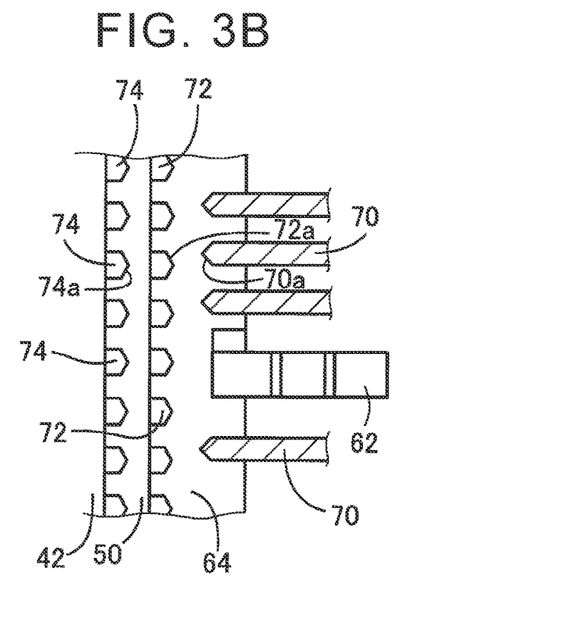
FIG. 3B is a development view illustrating the configuration and operation of the claw clutch of FIG. 1 in the released state thereof.
Figure 4A:
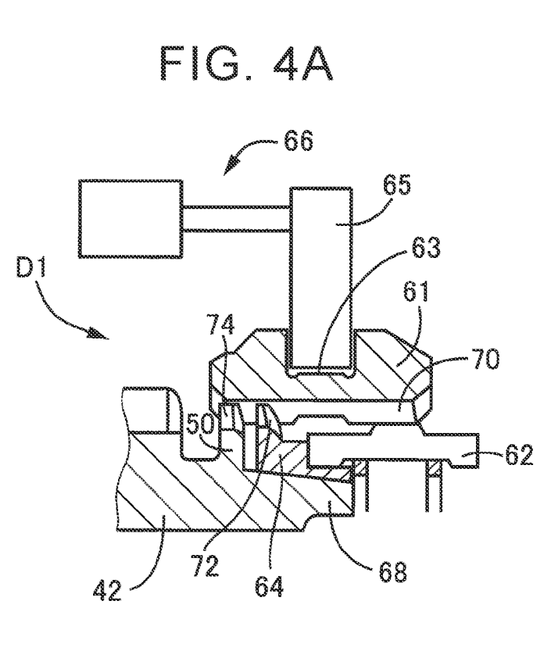
FIG. 4A is a cross-sectional view illustrating the configuration and operation of the claw clutch of FIG. 1 in an engaged state thereof.
Figure 4B:
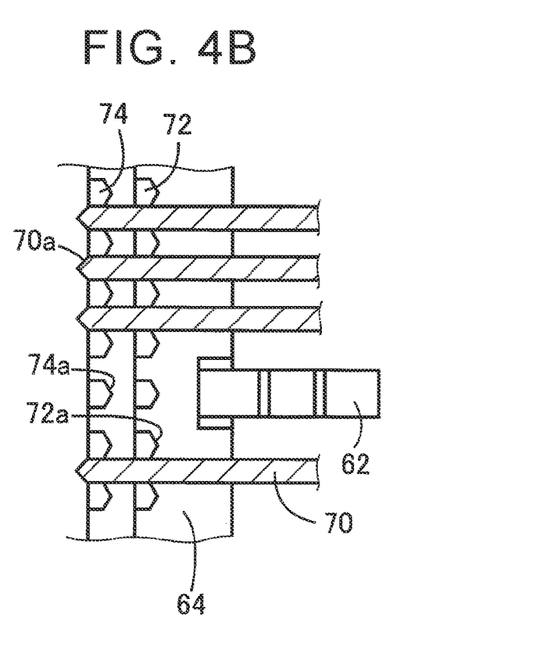
FIG. 4B is a development view illustrating the configuration and operation of the claw clutch of FIG. 1 in the engaged state thereof.

Each of FIGS. 3A and 3B and FIGS. 4A and 4B is a view illustrating the configuration and operation of the claw clutch D1 having the synchronous mechanism. Incidentally, each of FIGS. 3A and 3B shows a state where the claw clutch D1 is released (shut off), and each of FIGS. 4A and 3B shows a state where the claw clutch D1 is engaged (connected). Besides, each of FIGS. 3A and 4A is a cross-sectional view of the claw clutch D1, and each of FIGS. 3B and 4B is a development view of the state of each of FIGS. 3A and 4A except a cylindrical region of the hub sleeve 61, as viewed from an outer peripheral side.

As shown in FIG. 3A, the claw clutch D1 includes the second gear 50, the hub sleeve 61, a plurality of shifting keys 62, the synchronizer ring 64, and a cone portion 68. The second gear 50 is provided on the idler gear 42 that fits the countershaft 38 rotatably relatively thereto. The hub sleeve 61 is provided rotatably relatively to the countershaft 38 and movably relatively thereto in the axial direction thereof. The shifting keys 62 are engaged with the hub sleeve 61 by a key spring 60. The synchronizer ring 64 is interposed between the second gear 50 and the hub sleeve 61, and is rotated together with the shifting keys 62 with a predetermined play. The cone portion 68 is provided in the vicinity of the second gear 50. The spline teeth 70 are provided on an inner peripheral surface of the hub sleeve 61, and are constantly spline-fitted to the spline teeth 49 of the first gear 48 (see FIG. 6). Thus, the hub sleeve 61 is unrotatable relatively to the first gear 48 and the countershaft 38 and movable relatively thereto in the axial direction thereof. Incidentally, the second gear 50 is an example of the gear of the disclosure. The hub sleeve 61 is an example of the sleeve of the disclosure.

When the hub sleeve 61 is moved toward the second gear 50 side (leftward on the sheets of FIGS. 3A and 3B) in the axial direction of the countershaft 38, the synchronizer ring 64 is pressed against the cone portion 68 via the shifting keys 62, and motive power is transmitted to the second gear 50 through friction between the synchronizer ring 64 and the cone portion 68. An annular recess groove 63 is formed in an outer peripheral surface of the hub sleeve 61, and a shift fork 65 is fitted in this recess groove 63. The shift fork 65 is configured to be movable in the axial direction of the countershaft 38 by a hydraulic actuator 66. Accordingly, the hydraulic actuator 66 is configured to apply a thrust force acting in the axial direction of the countershaft 38 to the hub sleeve 61, via the shift fork 65. The hub sleeve 61 is moved in the axial direction of the countershaft 38 by the hydraulic actuator 66.

When the hub sleeve 61 is further moved toward the second gear 50 side, chamfers 70a that are provided at tips of the spline teeth 70 of the hub sleeve 61 are pressed against chamfers 72a that are provided at tips of the spline teeth 72 of the synchronizer ring 64 respectively, and the hub sleeve 61 and the synchronizer ring 64 are rotationally synchronized with each other. In this manner, the hub sleeve 61 and the second gear 50 are rotationally synchronized with each other via the synchronizer ring 64. When this rotational synchronization is completed, the spline teeth 70 are meshed with the spline teeth 72 that are provided on the synchronizer ring 64, and the spline teeth 74 that are provided on the second gear 50, and the claw clutch D1 is engaged, as shown in FIGS. 4A and 3B. Thus, the first gear 48 and the second gear 50 are integrally connected to each other, and the first motive power transmission path between the forward/backward changeover device 18 and the output gear 24 is formed. Incidentally, each of the spline teeth 70 is an example of the spline tooth that is provided on the sleeve of the disclosure. Each of the spline teeth 74 is an example of the spline tooth that is provided on the gear of the disclosure.

As described above, when the hub sleeve 61, the synchronizer ring 64, and the second gear 50 are rotationally synchronized with one another, the spline teeth 70 of the hub sleeve 61 move toward the second gear 50 side while jostling the spline teeth 72 of the synchronizer ring 64 and the spline teeth 74 of the second gear 50. In this case, when the thrust force of the hub sleeve 61 is large, a collision noise that is produced when the chamfers 70a of the spline teeth 70 of the hub sleeve 61 and the chamfers 74a that are provided at the tips of the spline teeth 74 of the second gear 50 collide with each other respectively becomes loud. In contrast, when the thrust force of the hub sleeve 61 is made small after rotational synchronization, the collision noise can be reduced. However, in the case where the chamfers 70a and 74a collide with each other respectively with the thrust force of the hub sleeve 61 being small, when the resistance force that is produced between the spline teeth 70 of the hub sleeve 61 and the spline teeth 49 of the first gear 48 that are spline-fitted to the spline teeth 70 is large, a sleeve failure that makes it difficult for the spline teeth 70 of the hub sleeve 61 to move while jostling the spline teeth 74 of the second gear 50 may occur.

For example, when an oil temperature Toil of hydraulic oil for operating the motive power transmission device 12 is low, the frictional resistance that is generated between friction materials of the forward clutch C1 that is arranged upstream of (on the engine 14 side of) the claw clutch D1 becomes large. In this connection, the drag torque that is transmitted to the spline teeth 70 of the hub sleeve 61 via the spline teeth 49 of the first gear 48 increases through transmission of torque to the forward clutch C1. Accordingly, the resistance force resulting from the drag torque that is produced between the spline teeth 70 of the hub sleeve 61 and the spline teeth 49 of the first gear 48 increases. Therefore, when the thrust force of the hub sleeve 61 is small, a sleeve failure may occur. Thus, a failure to engage the claw clutch D1 is restrained from being caused as a result of the occurrence of a sleeve failure while reducing a collision noise that is produced when the chamfers 70a of the spline teeth 70 of the hub sleeve 61 and the chamfers 74a of the spline teeth 74 of the second gear 50 collide with each other respectively, by controlling the thrust force of the hub sleeve 61 as will be described hereinafter, in a transition period when the claw clutch D1 is engaged.

Figure 5:
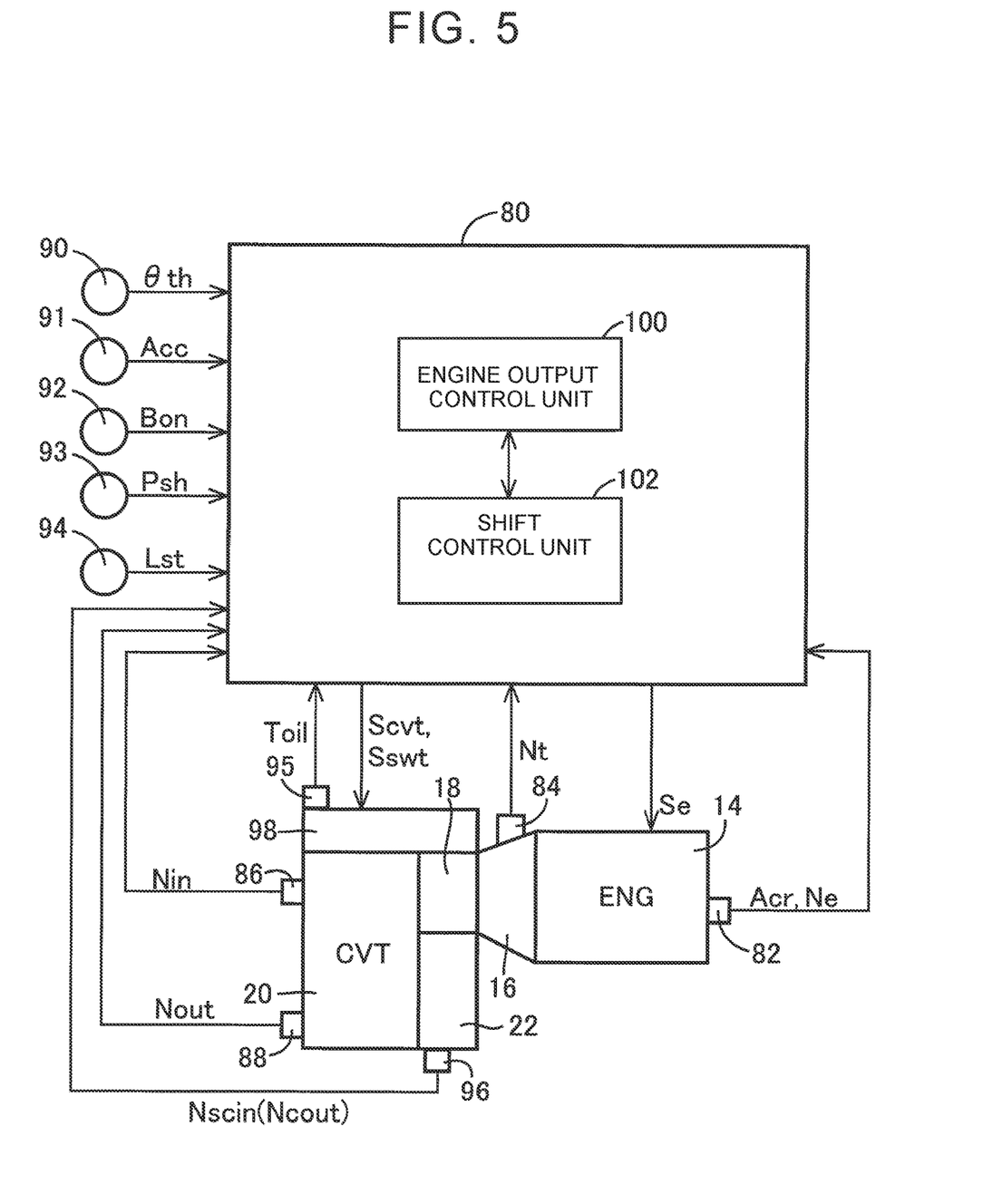
FIG. 5 is a functional block diagram illustrating an input/output system of an electronic control unit provided in the vehicle to control an engine, a continuously variable transmission and the like, and illustrating essential parts of control functions performed by the electronic control unit.

FIG. 5 is a functional block diagram illustrating an input/output system of an electronic control unit 80 provided in the vehicle 10 to control the engine 14, the continuously variable transmission 20, and the like, and illustrating essential parts of control functions performed by the electronic control unit 80. The electronic control unit 80 is configured to include, for example, a so-called microcomputer that is equipped with a CPU, a RAM, a ROM, an input/output interface, and the like. The CPU performs various kinds of control of the vehicle 10 by performing a signal process in accordance with a program stored in advance in the ROM while utilizing a temporary storage function of the RAM. For example, the electronic control unit 80 performs output control of the engine 14, shift control and belt clamping force control of the continuously variable transmission 20, control for appropriately changing over a running mode to either a gear running mode by the gear mechanism 22 or a belt running mode by the continuously variable transmission 20, and the like. The electronic control unit 80 is configured as separate control units, namely, a control unit for engine control, a control unit for continuously variable transmission control, a control unit for running pattern changeover, and the like, as needed.

Signals representing a rotational angle (a position) Acr of the crankshaft detected by an engine rotational speed sensor 82 and a rotational speed of the engine 14 (an engine rotational speed) Ne detected by the engine rotational speed sensor 82, a signal representing a rotational speed of the turbine shaft 26 (a turbine rotational speed) Nt detected by a turbine rotational speed sensor 84, a signal representing the input shaft rotational speed Nin as a rotational speed of the input shaft 32 of the continuously variable transmission 20

(the primary pulley 54) detected by an input shaft rotational speed sensor 86, a signal representing the output shaft rotational speed Nout as a rotational speed of the secondary pulley 56 of the continuously variable transmission 20 corresponding to the vehicle speed V detected by an output shaft rotational speed sensor 88, a signal representing a throttle opening degree θth of an electronic throttle valve detected by a throttle sensor 90, a signal representing an accelerator depression amount Acc as an operation amount of an accelerator pedal as a driver's acceleration request amount detected by an accelerator depression amount sensor 91, a signal representing brake on Bon that indicates a state where a foot brake as a service brake has been operated as detected by a foot brake switch 92, a signal representing a lever position (an operation position) Psh of a shift lever detected by a lever position sensor 93, signals representing a stroke amount Lst of the hydraulic actuator 66, namely, the stroke amount Lst of the hub sleeve 61 detected by a stroke sensor 94, a signal representing the oil temperature Toil of hydraulic oil in the motive power transmission device 12 detected by an oil temperature sensor 95, a signal representing a rotational speed Ncout of the countershaft 38 corresponding to a rotational speed Nscin of the hub sleeve 61 corresponding to a rotary member upstream of the claw clutch D1 as detected by a countershaft rotational speed sensor 96, and the like are supplied to electronic control unit 80. Besides, the electronic control unit 80 sequentially calculates an actual speed ratio γ(=Nin/Nout) of the continuously variable transmission 20 based on, for example, the output shaft rotational speed Nout and the input shaft rotational speed Nin.

Besides, engine output control command signals Se for output control of the engine 14, oil pressure control command signals Scvt for oil pressure control regarding the shifting of the continuously variable transmission 20, and oil pressure control command signals Sswt for controlling the forward/backward changeover device 18 (the forward clutch C1 and the backward brake B1), the belt running clutch C2, and the claw clutch D1 that are associated with changeover in the running pattern of the motive power transmission device 12, and the like are output from the electronic control unit 80.

In concrete terms, as the aforementioned engine output control command signals Se, a throttle signal for controlling the opening/closing of the electronic throttle valve by driving a throttle actuator, an injection signal for controlling the amount of fuel injected from a fuel injection device, an ignition timing signal for controlling the timing of ignition of the engine 14 by an ignition device, and the like are output. Besides, as the aforementioned oil pressure control command signals Scvt, a command signal for driving a linear solenoid valve (not shown) that adjusts a primary pressure Pin that is supplied to the primary-side hydraulic actuator 54c, a command signal for driving a linear solenoid valve (not shown) that adjusts a secondary pressure Pout that is supplied to the secondary-side hydraulic actuator 56c, and the like are output to an oil pressure control circuit 98. Furthermore, as the oil pressure control command signals Sswt, command signals for driving respective linear solenoid valves that control oil pressures supplied to the hydraulic actuator 66 that controls disconnection/connection of the forward clutch C1, the backward brake B1, the belt running clutch C2, and the claw clutch D1, and the like are output to the oil pressure control circuit 98.

Next, the essential parts of the control functions of the electronic control unit 80 will be described. An engine output control unit 100 shown in FIG. 5 outputs the engine output control command signals Se such as a throttle signal, an injection signal, an ignition timing signal, and the like to the throttle actuator, the fuel injection device, and the ignition device for the sake of, for example, output control of the engine 14. The engine output control unit 100 sets a target engine torque Te* for obtaining a required driving force (a driving torque) that is calculated based on, for example, the accelerator depression amount Acc and the vehicle speed V. The engine output control unit 100 controls the amount of fuel injection by the fuel injection device, and controls the ignition timing by the ignition device, in addition to controlling the opening/closing of the electronic throttle valve by the throttle actuator to obtain the target engine torque Te*.

The shift control unit 102 controls the speed ratio γ of the continuously variable transmission 20 to obtain a target speed ratio γ* that is calculated based on the accelerator depression amount Acc, the vehicle speed V, brake on Bon, and the like when the vehicle runs in the belt running mode. In concrete terms, the shift control unit 102 decides a primary command pressure Pintgt as a command value of the primary pressure Pin (a target primary pressure Pin*) and a secondary command pressure Pouttgt as a command value of the secondary pressure Pout (a target secondary pressure Pout*) to achieve the target speed ratio γ* of the continuously variable transmission 20 at which an operating point of the engine 14 is on an optimal line while preventing a belt of the continuously variable transmission 20 from slipping. Then, the shift control unit 102 outputs the primary command pressure Pintgt and the secondary command pressure Pouttgt to the oil pressure control circuit 98.

Besides, the shift control unit 102 performs changeover control for making a changeover between the gear running mode and the belt running mode. The shift control unit 102 stores, for example, a mode map (not shown) that prescribes running regions of the gear running mode and the belt running mode. The shift control unit 102 makes a determination on a changeover in the running mode, based on this mode map. The mode map is constituted of, for example, the output shaft rotational speed Nout and the accelerator depression amount Acc that correspond to the vehicle speed V. The shift control unit 102 determines that the running mode should be changed over, when the running state of the vehicle crosses a border between the gear running mode and the belt running mode on the mode map.

When it is determined that a changeover to the belt running mode should be made while the vehicle runs in, for example, the gear running mode, the shift control unit 102 performs a clutch-to-clutch shift for engaging the belt running clutch C2 while releasing the gear running clutch C1. Thus, the motive power transmission path in the motive power transmission device 12 is changed over from the first motive power transmission path to the second motive power transmission path, and the running mode is changed over from the gear running mode to the belt running mode (intermediate vehicle speed). Besides, when the changeover to the belt running mode (intermediate vehicle speed) is made, the shift control unit 102 outputs, to the oil pressure control circuit 98, a command to perform the operation of releasing the claw clutch D1 by the hydraulic actuator 66. Thus, through release of the claw clutch D1, the running mode is changed over from the belt running mode (intermediate vehicle speed) to the belt running mode (high vehicle speed). In this connection, while the vehicle runs in the belt running mode, co-rotation of rotary members (the large-diameter gear 40 and the like) that constitute the motive power transmission path from the claw clutch D1 to the planetary gear device 30 is prevented.

Besides, when it is determined that a changeover to the gear running mode should be made while the vehicle runs in the belt running mode (high vehicle speed), the shift control unit 102 first outputs, to the oil pressure control circuit 98, a command to perform the operation of engaging the claw clutch D1 by the hydraulic actuator 66. Thus, the running mode is transiently changed over from the belt running mode (high vehicle speed) to the belt running mode (intermediate vehicle speed). Subsequently, the shift control unit 102 performs a clutch-to-clutch shift for engaging the gear running clutch C1 while releasing the belt running clutch C2. Thus, the motive power transmission path in the motive power transmission device 12 is changed over from the second motive power transmission path to the first motive power transmission path.

Besides, the shift control unit 102 outputs, to the oil pressure control circuit 98, a command to perform the operation of engaging the claw clutch D1 by the hydraulic actuator 66, in preparation for the start of the vehicle in the gear running mode during stoppage of the vehicle. After that, when the driver changes over a shift operation position to a D position as a forward running position or an R position as a backward running position, the shift control unit 102 outputs, to the oil pressure control circuit 98, a command to engage the gear running clutch C1 or the backward brake B1.

Besides, the shift control unit 102 reduces the collision noise resulting from a collision between the chamfers 70a of the spline teeth 70 of the hub sleeve 61 (hereinafter referred to as the chamfers 70a of the hub sleeve 61) and the chamfers 74a of the spline teeth 74 of the second gear 50 (hereinafter referred to as the chamfers 74a of the second gear 50), by appropriately controlling a thrust force F of the hub sleeve 61 in the engagement transition period of the claw clutch D1.

The hub sleeve 61 is moved in the axial direction of the countershaft 38 by the hydraulic actuator 66 via the shift fork 65, so the oil pressure of the hydraulic actuator 66 corresponds to the thrust force F that is applied to the hub sleeve 61. In concrete terms, the product of the oil pressure of the hydraulic actuator 66 and the pressure receiving area of the hydraulic actuator 66 is equal to the thrust force that is applied to the hub sleeve 61. Accordingly, the shift control unit 102 controls the thrust force of the hub sleeve 61 by controlling the oil pressure of the hydraulic actuator 66.

Figure 6:
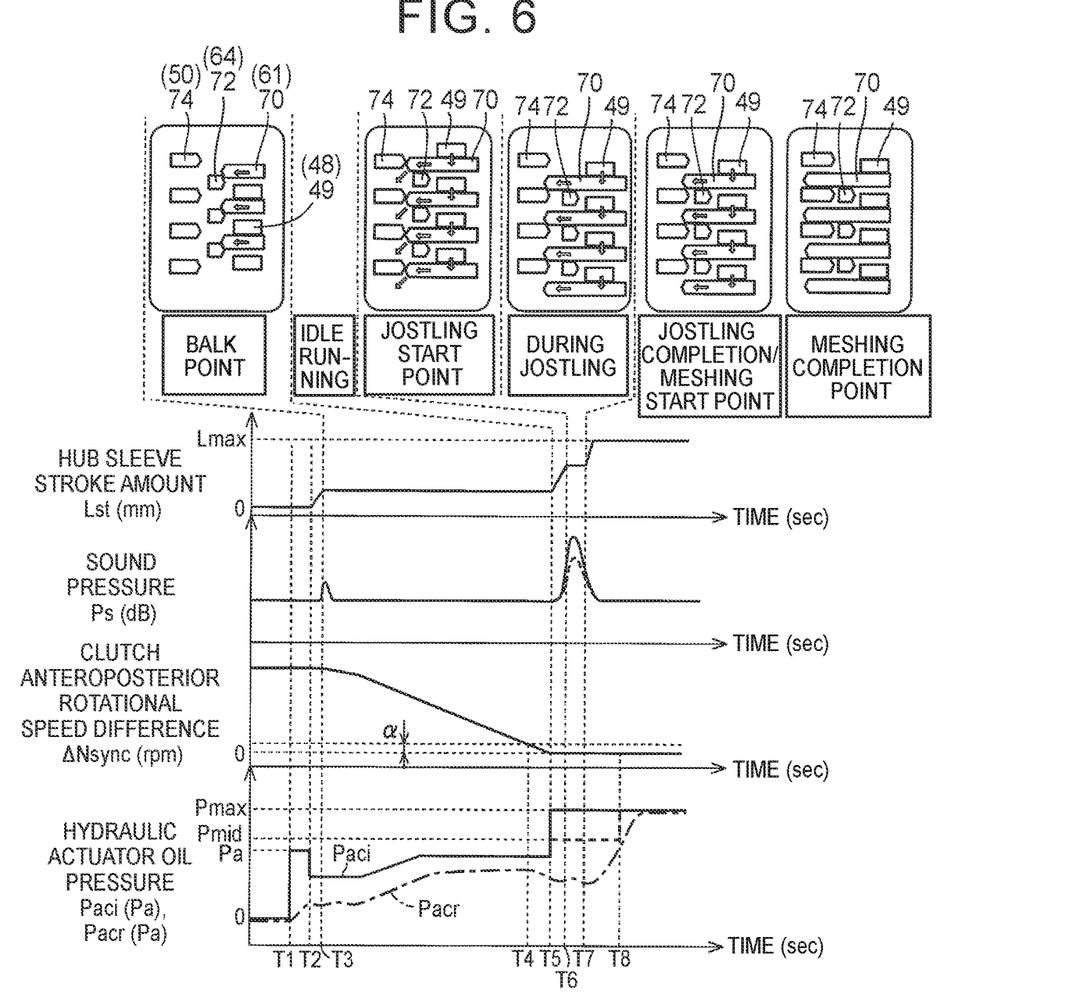
FIG. 6 is a time chart showing meshing states of respective spline teeth of the claw clutch at respective stages of an engagement transition period of the claw clutch, and showing a stroke amount of a hub sleeve, a sound pressure, a clutch anteroposterior rotational speed difference, and a command pressure for a hydraulic actuator in the engagement transition period.

FIG. 6 is a time chart showing meshing states of respective spline teeth of the claw clutch D1 at respective stages of an engagement transition period of the claw clutch D1, and showing the stroke amount Lst (mm) of the hub sleeve 61, a sound pressure Ps (dB), a clutch anteroposterior rotational speed difference ΔNsync (rpm) as a difference between rotational speeds of rotary members located in front of and behind the claw clutch D1, a command pressure Paci (Pa) for the hydraulic actuator 66, and an actual pressure Pacr (Pa) of the hydraulic actuator 66.

The stroke amount Lst of the hub sleeve 61 is detected by the stroke sensor 94. The stroke amount Lst increases as the hub sleeve 61 moves toward the second gear 50 side, with a position of the hub sleeve 61 where the claw clutch D1 shown in FIGS. 3A and 3B is stopped from being engaged being defined as zero. The sound pressure Ps is detected by a microphone arranged at a predetermined position. The clutch forward/backward rotational speed difference ΔNsync corresponds to a rotational speed difference (=|Nscin−Nscout|) between a rotational speed Nscin of the hub sleeve 61 corresponding to the rotary members upstream of the claw clutch D1 (on the engine 14 side) and a rotational speed Nscout of the second gear 50 corresponding to the rotary members downstream of the claw clutch D1 (on the output gear 24 side). The rotational speed Nscin of the hub sleeve 61 is detected by the countershaft rotational speed sensor 96. The rotational speed Nscout of the second gear 50 is calculated by multiplying the output shaft rotational speed Nout detected by the output shaft rotational speed sensor 88 by a gear ratio between the idler gear 42 and the input gear 52. In FIG. 6, the command pressure Paci for the hydraulic actuator 66 is indicated by a solid line, and the actual pressure Pacr corresponding to the command pressure Paci is indicated by an alternate long and short dash line.

When a command to engage the claw clutch D1 is output at a timing T1 shown in FIG. 6, the shift control unit 102 performs a so-called quick fill for temporarily raising the command pressure Paci for the hydraulic actuator 66 to a predetermined oil pressure Pa, so as to swiftly raise the actual pressure Pacr of the hydraulic actuator 66. The hub sleeve 61 starts moving toward the second gear 50 side at a timing T2, and the stroke amount Lst of the hub sleeve 61 thereby increases.

The chamfers 70a of the hub sleeve 61 and the chamfers 72a of the spline teeth 72 of the synchronizer ring 64 (hereinafter referred to as the chamfers 72a of the synchronizer ring 64) collide with each other respectively at a timing T3, and the hub sleeve 61 thereby stops moving. The state of each of the spline teeth at the timing T3 corresponds to a state shown at a left end of the upper stage of FIG. 6. A timing shown at the left end of the upper stage of FIG. 6 when the chamfers 70a of the hub sleeve 61 and the chamfers 72a of the synchronizer ring 64 collide with each other respectively (the timing T3) is referred to as a balk point (a synchronization start point). At the balk point, the chamfers 70a of the hub sleeve 61 and the chamfers 72a of the synchronizer ring 64 collide with each other respectively, and the sound pressure Ps thereby temporarily increases.

From the timing T3 to a timing T4, the shift control unit 102 controls the command pressure Paci for the hydraulic actuator 66 to an oil pressure at which the hub sleeve 61 and the second gear 50 are rotationally synchronized with each other via the synchronizer ring 64. Thus, from the timing T3 to the timing T4, the hub sleeve 61 and the second gear 50 are rotationally synchronized with each other, and the clutch anteroposterior rotational speed difference ΔNsync thereby gradually decreases.

When the clutch anteroposterior rotational speed difference ΔNsync becomes equal to or smaller than a synchronization determination value α set in advance at the timing T4, the shift control unit 102 determines that the hub sleeve 61 and the second gear 50 are to be rotationally synchronized with each other completely, and sets the command pressure Paci for the hydraulic actuator 66 to an intermediate pressure Pmid set in advance at a timing T5 after the lapse of a slight delay time from the timing T4. The intermediate pressure Pmid is set to an oil pressure value at which a collision noise that is produced when the chamfers 70a of the hub sleeve 61 and the chamfers 74a of the second gear 50 collide with each other respectively falls within a predetermined range, within such a range that the spline teeth 70 of the hub sleeve 61 can move in the axial direction of the countershaft 38 while jostling the spline teeth 72 of the synchronizer ring 64 and the spline teeth 74 of the second gear 50.

When the command pressure Paci for the hydraulic actuator 66 is set to the intermediate pressure Pmid indicated by a broken line at the timing T5 of FIG. 6, a thrust force that enables the spline teeth 70 of the hub sleeve 61 to move while jostling the spline teeth 72 of the synchronizer ring 64 and the spline teeth 74 of the second gear 50 is thereby applied to the hub sleeve 61. Besides, through application of the aforementioned thrust force to the hub sleeve 61, the hub sleeve 61 moves toward the second gear 50 side during an idle running period from the timing T5 to a timing T6, and the chamfers 70a of the hub sleeve 61 and the chamfers 74a of the second gear 50 then collide with each other respectively at the timing T6.

The state of the respective spline teeth of the claw clutch D1 at the timing T6 corresponds to a jostling start point shown on the upper stage of FIG. 6. As indicated by the jostling start point shown on the upper stage of FIG. 6, the hub sleeve 61 moves toward the second gear 50 side, and the chamfers 70a of the hub sleeve 61 and the chamfers 74a of the second gear 50 collide with each other respectively to produce a collision noise, so the sound pressure Ps becomes high. It should be noted herein that the command pressure Paci for the hydraulic actuator 66 is set to the intermediate pressure Pmid indicated by the broken line, and that the sound pressure Ps is thereby reduced.

In concrete terms, when the command pressure Paci for the hydraulic actuator 66 is set to a meshing completion pressure Pmax that is higher than the intermediate pressure Pmid indicated by a solid line, the thrust force F that is applied to the hub sleeve 61 becomes large, so the collision sound that is produced at the jostling start point becomes loud. Therefore, the sound pressure Ps assumes a value indicated by a solid line. In contrast, when it is determined that rotational synchronization has been completed, the command pressure Paci for the hydraulic actuator 66 is set to the intermediate pressure Pmid that is lower than the meshing completion pressure Pmax, and the sound pressure Ps that is generated at the meshing start point is thereby reduced below the sound pressure Ps in the case where the command pressure Paci indicated by the solid line is equal to the meshing completion pressure Pmax, as indicated by a broken line. Incidentally, the meshing completion pressure Pmax is set to a value at which the spline teeth 70 of the hub sleeve 61 can be forcibly meshed with the spline teeth 74 of the second gear 50 while jostling the spline teeth 74 regardless of an influence of the oil temperature Toil of hydraulic oil that will be described later, and the like.

The state of each of the spline teeth of the claw clutch D1 from the timing T6 to a timing T7 corresponds to a state during jostling shown on the upper stage of FIG. 6. As shown on the upper stage of FIG. 6, the spline teeth 70 of the hub sleeve 61 jostle the spline teeth 74 of the second gear 50 respectively, and the hub sleeve 61 can thereby move toward the second gear 50 side. Besides, the hub sleeve 61 cannot move during jostling, so the stroke amount Lst of the hub sleeve 61 does not increase. Besides, the chamfers 70a of the hub sleeve 61 and the chamfers 74a of the second gear 50 collide with each other respectively even during jostling, and the sound pressure Ps thereby becomes high. However, the command pressure Paci for the hydraulic actuator 66 during jostling is set to the intermediate pressure Pmid, and the sound pressure Ps is thereby reduced below the sound pressure Ps at the time of the meshing completion pressure Pmax indicated by the solid line, as indicated by the broken line.

When the jostling by the spline teeth 70 of the hub sleeve 61 is completed at the timing T7, the spline teeth 70 of the hub sleeve 61 and the spline teeth 74 of the second gear 50 can be meshed with each other respectively. The state of each of the spline teeth of the claw clutch D1 at the timing T7 corresponds to a jostling completion/meshing start point shown on the upper stage of FIG. 6. As indicated by the upper stage of FIG. 6, through completion of jostling at the timing T7, the spline teeth 70 of the hub sleeve 61 can move toward the second gear 50 side. Accordingly, at and after the timing T7, the meshing of the spline teeth 70 of the hub sleeve 61 and the spline teeth 74 of the second gear 50 is started.

When it is determined at a timing T8 that the spline teeth 70 of the hub sleeve 61 and the spline teeth 74 of the second gear 50 have been meshed with each other respectively, the shift control unit 102 sets the command pressure Paci for the hydraulic actuator 66 to the meshing completion pressure Pmax. The state of each of the spline teeth of the claw clutch D1 at the timing T8 corresponds to a meshing completion point shown at a right end of the upper stage of FIG. 6. As indicated by the meshing completion point on the upper stage of FIG. 6, the spline teeth 70 of the hub sleeve 61 and the spline teeth 74 of the second gear 50 are meshed with each other respectively. In this state, the command pressure Paci for the hydraulic actuator 66 is set to the meshing completion pressure Pmax, and engagement of the claw clutch D1 is thereby completed. Incidentally, it is determined whether or not the spline teeth 70 of the hub sleeve 61 and the spline teeth 74 of the second gear 50 have been meshed with each other respectively, based on whether or not the stroke amount Lst of the hub sleeve 61 detected by the stroke sensor 94 has reached a meshing completion value Lmax at which it is determined that the meshing has been completed.

As described above, after the hub sleeve 61 and the second gear 50 have been rotationally synchronized with each other, the command pressure Paci for the hydraulic actuator 66 is set to the intermediate pressure Pmid, and the sound pressure Ps at the jostling start point and during jostling is thereby reduced. By the way, when the oil temperature Toil of hydraulic oil in the motive power transmission device 12 becomes low, the viscosity of hydraulic oil becomes high, so the torque that is transmitted between the friction materials of the forward clutch C1 becomes large. The torque that is generated at this forward clutch C1 is transmitted to the first gear 48 via the large-diameter gear 40 and the like, so the resistance force resulting from friction that is produced between the spline teeth 70 of the hub sleeve 61 and the spline teeth 49 of the first gear 48 increases. That is, the thrust force F of the hub sleeve 61 that is needed for the spline teeth 70 of the hub sleeve 61 to move toward the second gear 50 side while jostling the spline teeth 74 of the second gear 50 respectively against the resistance force increases.

Figure 7:
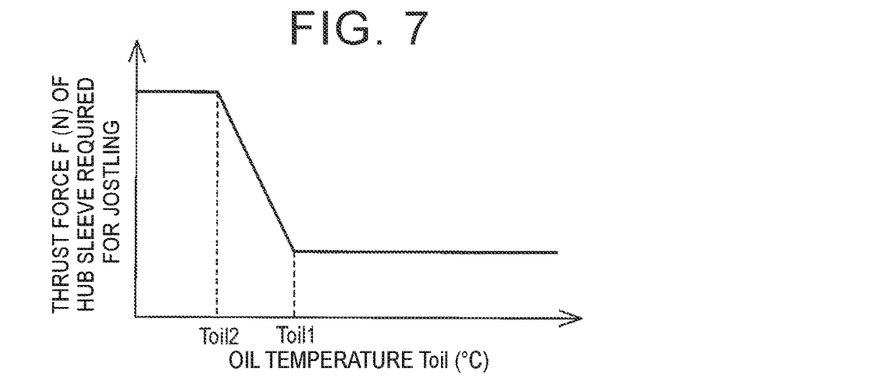
FIG. 7 is a view showing a relationship between an oil temperature of a hydraulic oil used for the motive power transmission device and a thrust force of the hub sleeve required for jostling.

FIG. 7 shows a relationship between the oil temperature Toil of hydraulic oil and the thrust force F of the hub sleeve 61 that is required for jostling. As shown in FIG. 7, in a region where the oil temperature Toil is equal to or higher than a first predetermined temperature Toil1, the thrust force F of the hub sleeve 61 is small, and the thrust force F hardly changes regardless of the oil temperature Toil. On the other hand, when the oil temperature Toil becomes lower than the first predetermined temperature Toil1, the thrust force F increases as the oil temperature Toil falls. Then, when the oil temperature Toil falls to a second predetermined temperature Toil2, the thrust force F becomes sufficiently large. In this manner, in a region where the oil temperature Toil of hydraulic oil is low, the thrust force F of the hub sleeve 61 that is required for jostling increases as the oil temperature Toil of hydraulic oil falls.

Accordingly, at the jostling start point of the spline teeth 70 of the hub sleeve 61 and during the jostling by the spline teeth 70 of the hub sleeve 61, the command pressure Paci for the hydraulic actuator 66 is set to the intermediate pressure Pmid, and the collision noise is thereby reduced. However, when the oil temperature Toil is low, the thrust force F of the hub sleeve 61 that is required for jostling may become larger than a thrust force based on the intermediate pressure Pmid. At this time, a sleeve failure that makes it difficult for the spline teeth 70 of the hub sleeve 61 to be meshed with the spline teeth 74 of the second gear 50 while jostling the spline teeth 74 of the second gear 50 respectively may occur.

In order for the spline teeth 70 of the hub sleeve 61 and the spline teeth 74 of the second gear 50 to be meshed with each other respectively even in the case where the aforementioned sleeve failure occurs, the shift control unit 102 sets the command pressure Paci for the hydraulic actuator 66 to the meshing completion pressure Pmax when the spline teeth 70 of the hub sleeve 61 and the spline teeth 74 of the second gear 50 have not been meshed with each other even after the lapse of a predetermined time tf set in advance since a timing when the command pressure Paci for the hydraulic actuator 66 is set to the intermediate pressure Pmid as soon as it is determined that the hub sleeve 61 and the second gear 50 have been rotationally synchronized with each other. Accordingly, even when a sleeve failure occurs with the spline teeth 70 of the hub sleeve 61 and the spline teeth 74 of the second gear 50 not meshed with each other respectively, the command pressure Paci is set to the meshing completion pressure Pmax upon the lapse of the predetermined time tf since the timing when the command pressure Paci is set to the intermediate pressure Pmid. Therefore, the thrust force F of the hub sleeve 61 that is required for jostling is applied, and the spline teeth 70 of the hub sleeve 61 are meshed with the spline teeth 74 of the second gear 50 while jostling the spline teeth 74 respectively. As a result, the sleeve failure is resolved.

The aforementioned predetermined time tf is obtained in advance through an experiment or in terms of design, and is set to a time for completion of the meshing of the spline teeth 70 of the hub sleeve 61 and the spline teeth 74 of the second gear 50 with no sleeve failure occurring. Incidentally, a margin time that takes the variability of parts and the like into account is added to the predetermined time tf. Besides, the predetermined time tf is changed in accordance with the oil temperature Toil of hydraulic oil.

Figure 8:
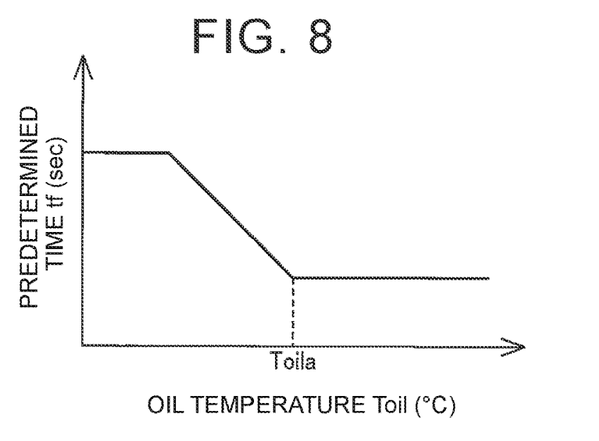
FIG. 8 is a relationship map for obtaining a predetermined time based on the oil temperature of the hydraulic oil.

FIG. 8 is a relationship map for obtaining the predetermined time tf based on the oil temperature Toil of hydraulic oil. As shown in FIG. 8, when the oil temperature Toil of hydraulic oil is equal to or higher than a predetermined oil temperature Toila, the predetermined time tf assumes a constant value. However, when the oil temperature Toil becomes lower than the predetermined oil temperature Toila, the predetermined time tf is set to a time that lengthens as the oil temperature Toil falls. That is, the predetermined time tf is set to a time that is longer when the oil temperature Toil of hydraulic oil is low than when the oil temperature Toil of hydraulic oil is high, in a low-temperature region equal to or lower than the predetermined oil temperature Toila.

When the oil temperature Toil of hydraulic oil becomes low, the resistance force that is applied between the spline teeth 70 of the hub sleeve 61 and the spline teeth 49 of the first gear 48 becomes large, so the moving speed of the hub sleeve 61 becomes low. Besides, the responsiveness of the hydraulic actuator 66 also deteriorates as the oil temperature Toil of hydraulic oil falls. Accordingly, when the oil temperature Toil of hydraulic oil becomes low, the time required until completion of the meshing of the spline teeth 70 of the hub sleeve 61 and the spline teeth 74 of the second gear 50 becomes long, even with no sleeve failure occurring. Accordingly, the predetermined time tf is set to a time that is longer when the oil temperature Toil of hydraulic oil is low than when the oil temperature Toil of hydraulic oil is high, in the low-temperature region equal to or lower than the predetermined oil temperature Toila.

In the case where the predetermined time tf is a constant value regardless of the oil temperature Toil of hydraulic oil, the command pressure Paci may be set to the meshing completion pressure Pmax after the lapse of the predetermined time tf before the completion of meshing, although the meshing is completed at the intermediate pressure Pmid if the predetermined time tf is lengthened, with the oil temperature Toil of hydraulic oil in the low-temperature region. It should be noted herein that when the command pressure Paci for the hydraulic actuator 66 is set to the meshing completion pressure Pmax before the completion of meshing, the collision noise that is produced in the jostling transition period of the spline teeth 70 of the hub sleeve 61 becomes loud and hence undesirable. In contrast, the predetermined time tf is set longer when the oil temperature Toil of hydraulic oil is low than when the oil temperature Toil of hydraulic oil is high. Thus, the predetermined time tf is set to an appropriate time corresponding to the oil temperature Toil. When no sleeve failure occurs, the meshing can be completed with the command pressure Paci for the hydraulic actuator 66 equal to the intermediate pressure Pmid. Accordingly, the collision noise that is produced in the jostling transition period of the spline teeth 70 of the hub sleeve 61 can be effectively reduced.

Figure 9:
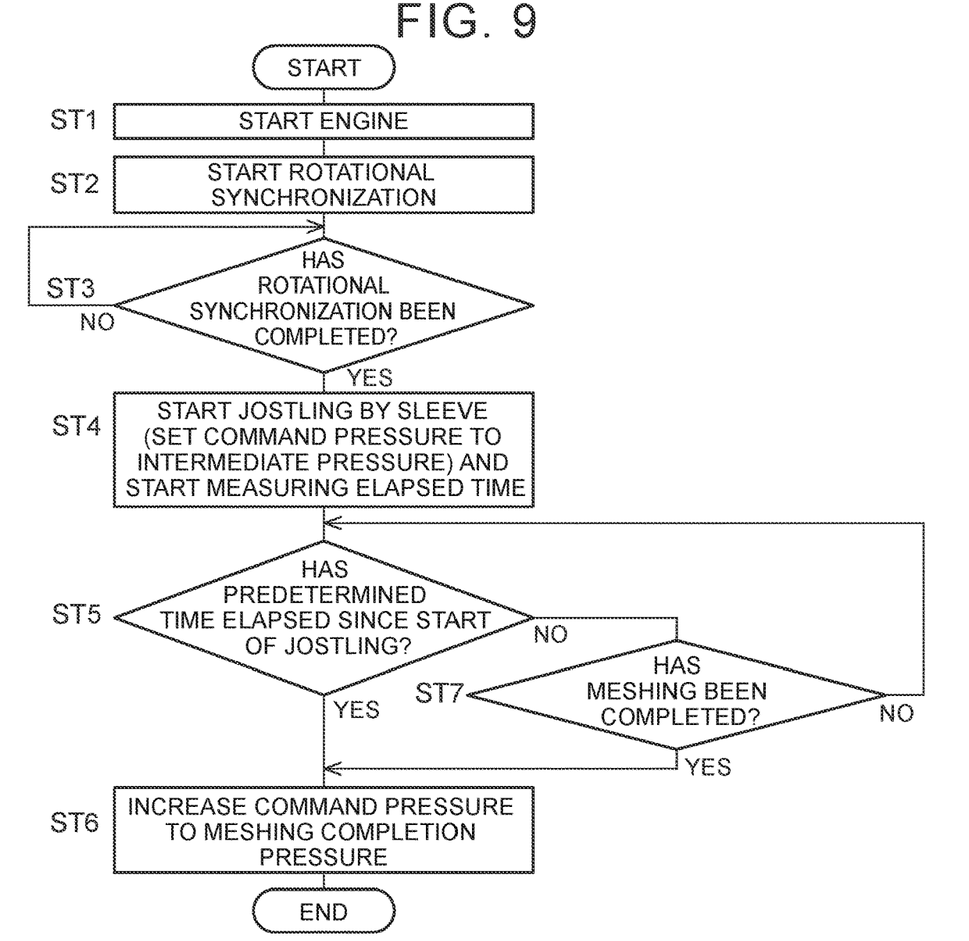
FIG. 9 is a flowchart illustrating the control operation of the electronic control unit in starting the engine mounted in the vehicle.

FIG. 9 is a flowchart illustrating the control operation of the electronic control unit 80 in starting the engine. This flowchart is carried out in starting the engine. In starting the engine, the claw clutch D1 is engaged in preparation for the start of the vehicle. The flowchart of FIG. 9 illustrates the control operation in the engagement transition period of the claw clutch D1 in preparation for the start of the vehicle after the start of the engine.

First of all, in step ST1 (the term "step" will be omitted hereinafter) corresponding to the control function of the engine output control unit 100, the engine 14 is started. Subsequently, in ST2 corresponding to the control function of the shift control unit 102, the command pressure Paci for the hydraulic actuator 66 is raised, and rotational synchronization of the hub sleeve 61 and the second gear 50 is started. In ST3 corresponding to the control function of the shift control unit 102, it is determined whether or not rotational synchronization is completed, based on whether or not the clutch anteroposterior rotational speed difference ΔNsync has become equal to or smaller than a synchronization determination value α. While the clutch anteroposterior rotational speed difference ΔNsync is larger than the synchronization determination value α, the result of the determination in ST3 is negative. Until the clutch anteroposterior rotational speed difference ΔNsync becomes equal to or smaller than the synchronization determination value α, ST3 is repeatedly carried out.

When the clutch anteroposterior rotational speed difference ΔNsync becomes equal to or smaller than the synchronization determination value α, the result of the determination in ST3 becomes positive. In ST4 corresponding to the control function of the shift control unit 102, the command pressure Paci for the hydraulic actuator 66 is set to the intermediate pressure Pmid, and the jostling by the spline teeth 70 of the hub sleeve 61 is started. Besides, at the same time, an elapsed time t since the timing when the command pressure Paci for the hydraulic actuator 66 is set to the intermediate pressure Pmid is started.

In ST5 corresponding to the control function of the shift control unit 102, it is determined whether or not the predetermined time tf has elapsed since the start of jostling (the timing when the command pressure Paci is set to the intermediate pressure Pmid), namely, whether or not the elapsed time t has reached the predetermined time tf. If the predetermined time tf has not elapsed, the result of the determination in ST5 is negative. In ST7 corresponding to the control function of the shift control unit 102, it is determined whether or not the spline teeth 70 of the hub sleeve 61 and the spline teeth 74 of the second gear 50 have been meshed with each other respectively. If the spline teeth 70 and the spline teeth 74 have not been meshed with each other respectively, the result of the determination in ST7 is negative, and the jostling by the spline teeth 70 of the hub sleeve 61 is continuously carried out. Then, returning to ST5, it is repeatedly determined whether or not the predetermined time tf has elapsed. On the other hand, if it is determined in ST7 that the spline teeth 70 and the spline teeth 74 have been meshed with each other respectively, the command pressure Paci for the hydraulic actuator 66 is set to the meshing completion pressure Pmax to complete engagement of the claw clutch D1, in ST6 corresponding to the control function of the shift control unit 102.

Returning to ST5, if it is determined that the predetermined time tf has elapsed since the start of jostling, the result of the determination in ST5 is positive. In ST6, the command pressure Paci for the hydraulic actuator 66 is set to the meshing completion pressure Pmax. Thus, even when a sleeve failure occurs, the command pressure Paci is set to the meshing completion pressure Pmax, and the thrust force F enabling the jostling by the spline teeth 70 is thereby applied to the hub sleeve 61. Therefore, engagement of the claw clutch D1 is completed.

Owing to the above-mentioned control, the collision noise that is produced during engagement of the claw clutch D1 is reduced. Also, even in the case where a sleeve failure occurs when the oil temperature Toil of hydraulic oil is low, the claw clutch D1 can be engaged while resolving the sleeve failure. Incidentally, the flowchart of FIG. 9 is applied in starting the engine. However, even when a command to engage the claw clutch D1 is output during running, the same control operation as in steps ST2 to ST7 of FIG. 9 is performed.

As described above, according to the present embodiment, when it is determined that the hub sleeve 61 and the second gear 50 have been rotationally synchronized with each other in the engagement transition period of the claw clutch D1, the command pressure Paci for the hydraulic actuator 66 is set to the intermediate pressure Pmid that is lower than the meshing completion pressure Pmax. Thus, the thrust force F of the hub sleeve 61 becomes small, and the collision noise that is produced when the spline teeth 70 of the hub sleeve 61 and the spline teeth 74 of the second gear 50 collide with each other respectively in the jostling transition period of the spline teeth 70 of the hub sleeve 61 is reduced. It should be noted herein that when the oil temperature Toil of hydraulic oil becomes low, the drag torque applied to the hub sleeve 61 increases. Thus, when the command pressure Paci for the hydraulic actuator 66 is set to the intermediate pressure Pmid, the thrust force F of the hub sleeve 61 becomes smaller than the resistance force resulting from the drag torque, and a sleeve failure may occur with the hub sleeve 61 unable to move toward the second gear 50 side. In contrast, when the spline teeth 70 of the hub sleeve 61 and the spline teeth 74 of the second gear 50 have not been meshed with each other respectively even after the lapse of the predetermined time tf since the timing when the command pressure Paci for the hydraulic actuator 66 is set to the intermediate pressure Pmid, the command pressure Paci for the hydraulic actuator 66 is set to the meshing completion pressure Pmax. Therefore, even when the hub sleeve 61 becomes unable to move toward the second gear 50 side, the command pressure Paci for the hydraulic actuator 66 is set to the meshing completion pressure Pmax upon the lapse of the predetermined time tf. Thus, the hub sleeve 61 is forcibly moved toward the second gear 50 side, and the sleeve failure is resolved. In this manner, reduction of the collision noise that is produced in the engagement transition period of the claw clutch D1 and resolution of the sleeve failure can be made compatible with each other.

Besides, according to the present embodiment, the predetermined time tf as a determination threshold for determining whether to set the command pressure Paci for the hydraulic actuator 66 to the meshing completion pressure Pmax or not is set longer when the oil temperature Toil of hydraulic oil is low than when the oil temperature Toil of hydraulic oil is high. When the oil temperature Toil of hydraulic oil becomes low, the resistance force applied to the hub sleeve becomes large, and the responsiveness of the hydraulic actuator 66 also deteriorates. Therefore, the time that is required until the hub sleeve 61 moves to the meshing completion position also becomes long. Accordingly, the predetermined time tf is set in accordance with the oil temperature Toil of hydraulic oil as described above, and hence assumes an appropriate value corresponding to the oil temperature Toil. In this connection, if no sleeve failure has occurred even when the oil temperature Toil of hydraulic oil is low, the meshing can be completed with the command pressure Paci equal to the intermediate pressure Pmid, and the collision noise that is produced in the engagement transition period of the claw clutch D1 can be effectively reduced.

Although the embodiment of the disclosure has been described above in detail based on the drawings, the disclosure is applied to other aspects as well.

For example, in the foregoing embodiment, the disclosure is applied to the claw clutch D1 with which the motive power transmission device 12 having the continuously variable transmission 20 and the gear mechanism 22 in parallel with each other is equipped. However, the disclosure is not necessarily limited to this embodiment. The disclosure is appropriately applicable to any synchronous meshing mechanism that is operated by a hydraulic actuator.

Incidentally, the foregoing is nothing more than the embodiment. The disclosure can be carried out in an aspect subjected to various alterations and improvements based on the knowledge of those skilled in the art.

What is claimed is:

1. A control apparatus for a synchronous meshing mechanism, the synchronous meshing mechanism including
   a gear that is configured to fit a rotary shaft and is rotatable relative to the rotary shaft,
   a sleeve that is provided unrotatable relative to the rotary shaft and movable relative to the rotary shaft in an axial direction of the rotary shaft,
   a synchronizer ring that is interposed between the gear and the sleeve, and
   a hydraulic actuator that applies a thrust force to the sleeve, the hydraulic actuator being configured to move the sleeve in the axial direction of the rotary shaft, and mesh a spline tooth that is provided on the gear and a spline tooth that is provided on the sleeve with each other after rotationally synchronizing the sleeve and the gear with each other via the synchronizer ring, upon moving the sleeve toward the gear side in the axial direction of the rotary shaft, the control apparatus comprising an electronic control unit that is configured to:

set a command pressure for the hydraulic actuator to an intermediate pressure that is lower than a meshing completion pressure at which the spline tooth of the sleeve and the spline tooth of the gear are meshed with each other, when it is determined that the sleeve and the gear have been rotationally synchronized with each other;

set the command pressure for the hydraulic actuator to the meshing completion pressure when the spline tooth of the sleeve and the spline tooth of the gear have been meshed with each other; and set the command pressure for the hydraulic actuator to the meshing completion pressure when the spline tooth of the sleeve and the spline tooth of the gear have not been meshed with each other even after lapse of a predetermined time set in advance from a timing when the command pressure for the hydraulic actuator is set to the intermediate pressure.

2. The control apparatus according to claim 1, wherein the electronic control unit is configured to set the command pressure to the intermediate pressure assuming a value at which the spline tooth of the sleeve is able to move while jostling a spline tooth of the synchronizer ring and the spline tooth of the gear, after rotational synchronization of the synchronous meshing mechanism.

3. The control apparatus according to claim 1, wherein the electronic control unit is configured to set the meshing completion pressure to a value at which the spline tooth of the sleeve and the spline tooth of the gear are able to be forcibly meshed with each other, regardless of an influence of an oil temperature of a hydraulic oil in the synchronous meshing mechanism.

4. The control apparatus according to claim 1, wherein the electronic control unit is configured to:
 change the predetermined time in accordance with an oil temperature of a hydraulic oil; and
 set the predetermined time longer when the oil temperature of the hydraulic oil is low than when the oil temperature of the hydraulic oil is high.

* * * * *